June 18, 1957        J. GONSKI        2,796,245

CUTTINGS CLEAN UP MECHANISM FOR BORING TYPE MINING MACHINE

Filed May 31, 1956        2 Sheets—Sheet 1

INVENTOR.
Joseph Gonski
BY
Murray A. Gleeson
ATTORNEY

INVENTOR.
Joseph Gonski
BY
Murray A. Gleeson
ATTORNEY

United States Patent Office 2,796,245
Patented June 18, 1957

2,796,245

CUTTINGS CLEAN UP MECHANISM FOR BORING TYPE MINING MACHINE

Joseph Gonski, Chicago, Ill., assignor to Goodman Manufacturing Company, Chicago, Ill., a corporation of Illinois Application May 31, 1956, Serial No. 588,461

5 Claims. (Cl. 262—7)

This invention relates to improvements in mining machines of the multiple boring head type in which a plurality of boring heads are rotatable in side-by-side relation in advance of the machine for producing a plurality of contiguous bores in a working face.

More particularly, the present invention relates to a mining machine having at least four boring heads, but with a single conveyor disposed centrally of the machine frame with a receiving throat or opening to the rear of the two innermost boring heads.

One of the principal problems with multiple boring heads of the general character above described is that of transferring the cuttings produced by the outermost cutter heads inwardly toward the conveyor throat at the center of the machine without undue interference with the operation of the cutter heads or breakage of the loose material. Machines of this character are particularly adapted for removing material from a solid working face in coal mines. The dislodged coal is of such substantial volume as compared with solid coal that means must be provided to move the dislodged material away from the working face with a minimum of breakage, since the commercial value of coal is usually enhanced by recovery with as large a percentage of lump coal as possible.

This problem of removing the dislodged material from the outermost boring heads is further complicated by the fact that each of the boring heads preferably consists of at least two radially extending cutter arms of equal length, which partially overlap the arms of an adjacent cutter head, so that the rotation of the cutter heads must be synchronized so as to avoid interference between the ends of their arms. It is also desirable to rotate the two innermost boring heads in opposite directions to each other so as to sweep the cuttings inwardly along the floor toward the central conveyor. At the same time it is desirable to rotate each of the outer boring heads in the opposite direction to their adjacent inner heads so as to avoid interference between the ends of their respective arms. Such direction of rotation of the outer boring heads, however, would ordinarily tend to sweep the cuttings produced by the outermost heads along the floor in the direction away from the adjacent inner heads thereby prohibiting the free flow of loose material toward the central conveyor.

The object of the present invention is to provide an improved four-boring head machine of the type above described, wherein means are provided for insuring a continuous flow of loose material from the outermost pair of boring heads inwardly along the floor to the center conveyor, even though the outermost boring heads are rotated in opposite directions to their adjacent inner boring heads.

In carrying out my invention, I provide auxiliary sweep or paddle means rotatably mounted to the rear of and concentric with the outermost cutter heads, so as to convey the major portion of the cuttings dislodged by the outermost cutter heads in the direction opposite to the direction of rotation of said outermost cutter heads.

The invention may best be understood by referring to the accompanying drawings, in which—

Figure 1:
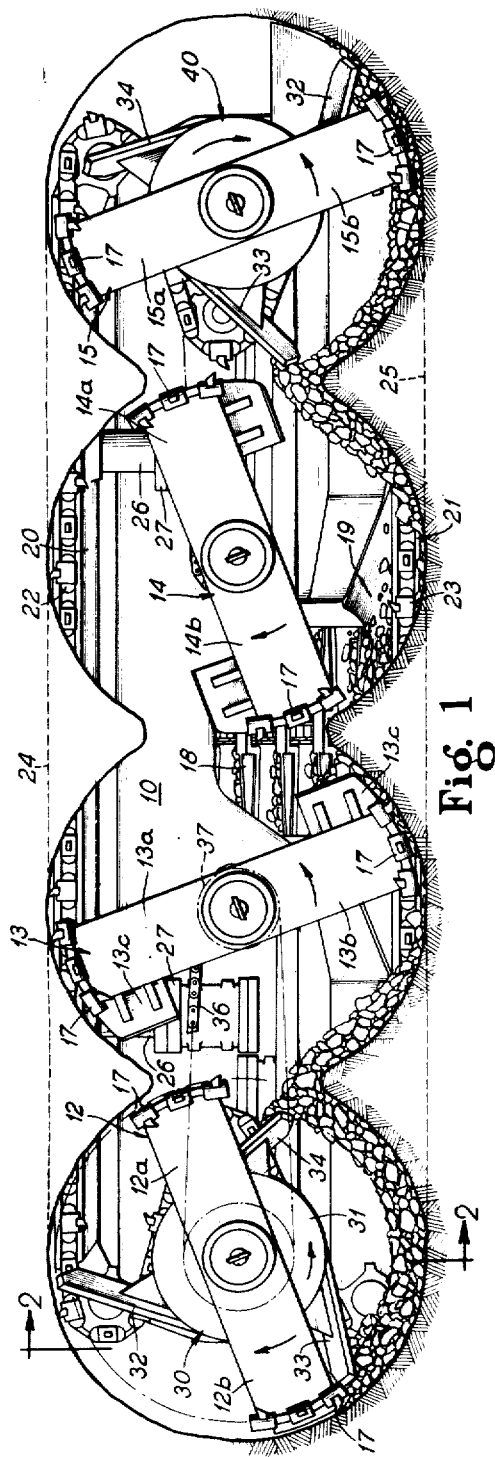
Figure 1 is a vertical section taken through the bores formed by the machine in the working face, and looking toward the front end of a mining machine constructed in accordance with my invention.

Referring now to the embodiment of my invention illustrated in the drawings, the mining machine has a main frame indicated generally at 10 mounted for movement along the mine floor as by means of conventional endless treads 11. Four cutter heads 12, 13, 14 and 15 are rotatably supported at the front end of the frame 10 on suitable bearings, one of which bearings for the cutter head 12 is shown at 16 in Figure 2. Each of the cutter heads consists of a pair of radially extending cutter arms of equal length, the cutter head 12 having cutter arms 12a, 12b, the cutter head 13 having cutter arms 13a and 13b, the cutter head 14 having cutter arms 14a and 14b, and the cutter head 15 having arms 15a and 15b. Each of the said cutter arms have cutter supports 17 at their outer ends which extend forwardly from their respective cutter arms to cut a circular kerf in the working face in the usual manner.

At the center of the machine frame 10 is an elevating conveyor 18 of conventional form used with machines of this general type. This conveyor 18 has a forwardly opening throat 19 adjacent the floor level for receiving the cuttings dislodged by the cutter heads, and removing the cuttings toward the rear of the machine in the usual manner. The machine may also have upper and lower cutter bars 20 and 21 mounted as usual rearwardly of the cutter heads. These cutter bars are adapted to support lengths of cutter chains 22 and 23 in positions tangential to the upper and lower cutting limits of the several cutter heads, as indicated by the dotted lines 24 and 25, so as to remove or trim the depending and upstanding cusps left between the adjacent bores formed by said cutter heads (see Figure 1).

As is also customary, the upper cutter bar may have vertical adjustment by pistons 26 in hydraulic cylinders 27, and the lower cutter bar 21 may have similar vertical adjustment by pistons 28 in hydraulic cylinders 29. This vertical adjustment of the upper and lower cutter bars relative to the machine frame is provided to aid in permitting the machine as a whole to be withdrawn from the working face and, in some instances, to vary slightly the total working height of the bore pattern to be cut by the machine.

Referring now more particularly to the means for removing the cuttings dislodged by the several boring heads, the inner pair of boring heads 13 and 14 are rotated as usual in synchronized relation in opposite directions to each other to avoid interference with each other, as indicated by the arrows in Figure 1, so as to sweep the cuttings inwardly toward the center throat 19 of the conveyor 18. To aid in sweeping the cuttings inwardly and rearwardly, scoops are mounted on the ends of each of the arms as is customary with machines of this general type. In the form shown, the arms 13a and 13b of head 13 each has a scoop 13c on its leading edge. The front faces of these scoops are inclined at an intermediate angle relative to the plane of rotation of their respective arms, so as to urge the material rearwardly toward the machine frame while sweeping it inwardly toward the central conveyor throat 19. The arms 14a and 14b of head 14 are provided with similar scoops, but arranged in reversed relation, since the heads 13 and 14 rotate in opposite directions to each other.

Figure 2:
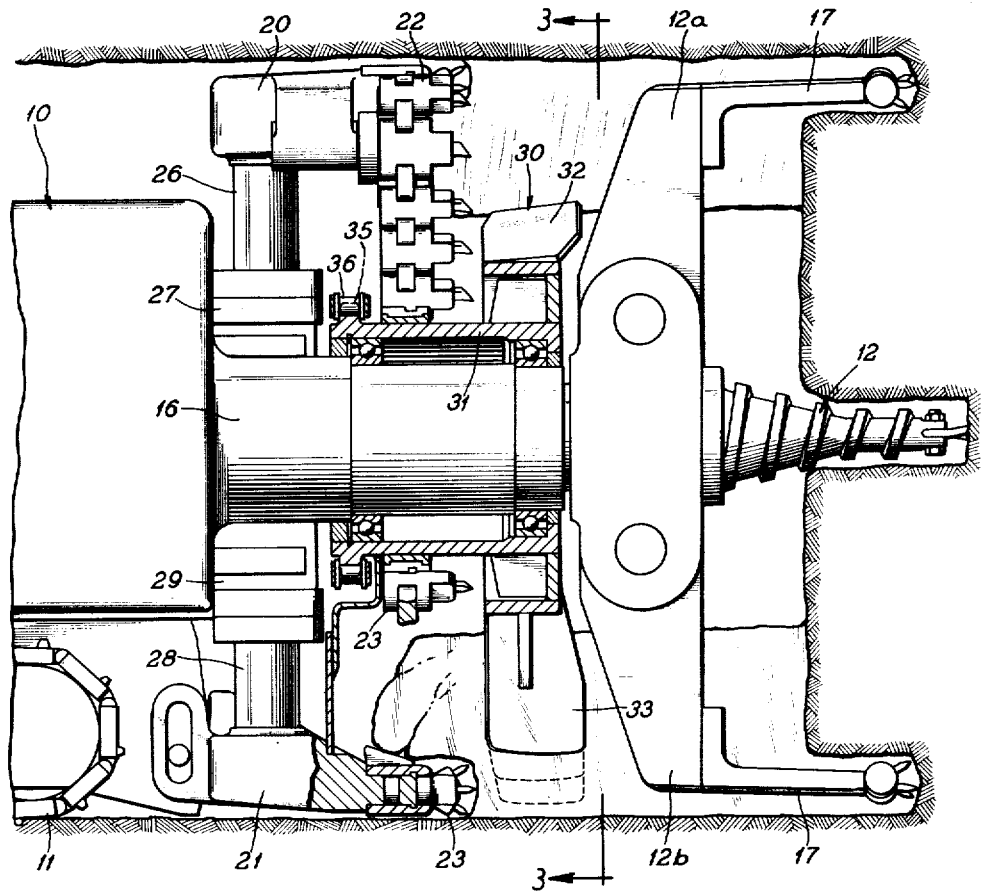
Figure 2 is an enlarged side view of the machine shown in Figure 1, with parts thereof shown in section along line 2—2 of Fig. 1.

It will be noted from Figure 1 that the outermost pair of cutter heads 12 and 15 are each rotated in a direction opposite to that of their adjacent inner cutter heads 13 and 14, respectively, as is desirable in order to avoid interference between the adjacent ends of their cutter arms. Instead of providing the arms of these outer cutter heads 12 and 15 with conventional scoops, however, these outer heads are provided with paddle assemblies 30 and 40 respectively, which are mounted for independent rotation immediately to the rear of the cutter arms of their respective heads, and are driven in the direction opposite to that of their respective heads. For example, the paddle head assembly 30 on cutter head 12 consists of a hub 31 rotatably mounted on the main bearing 16 of the cutter head 12, as seen in Figure 2. Mounted on the hub 31 is a plurality of paddles 32, 33, and 34. In the form shown, these three paddles are of different lengths, paddle 32 being the longest, paddle 33 being of intermediate length, and paddle 34 being the shortest. These three paddles rotate in the space between the rear of the cutter head arms 12a and 12b and the cutter chains 22 and 23 of cutter bars 20 and 21, respectively. As seen in Figure 2, the hub 31 is extended rearwardly along the bearing 16 to the rear of the path of movement of the cutter chain 23, and is provided with a sprocket 35 at its rear end which is engaged by a drive chain 36 extending to a sprocket 37 fixed on the hub 38 of the adjacent cutter head 13. It will be observed, therefore, that the hub 31 on which the paddles 32, 33 and 34 are mounted, will be driven by and in the same direction as the adjacent cutter head 13, that is to say, in the direction opposite to the direction in which the outer cutter head 12 is driven, as seen by the arrows in Figure 1.

In the preferred form shown, each of the paddles 32, 33 and 34 is arranged at a retreating angle with respect to the direction of rotation of their hub 31. Also, the leading face of each of said paddles is inclined rearwardly at an intermediate angle to the plane of rotation of the assembly for urging the loose material away from the adjacent cutter arms 12a and 12b, but at the same time tending to sweep the cuttings inwardly along the floor for discharge into the adjacent bore being formed by the cutter head 13 (see Figure 1).

The paddle assembly 40 on the opposite outer cutter head 15 is similar to the paddle structure 30 just described, excepting that the paddles are disposed in reversed relation and rotate in the opposite direction.

Figure 3:
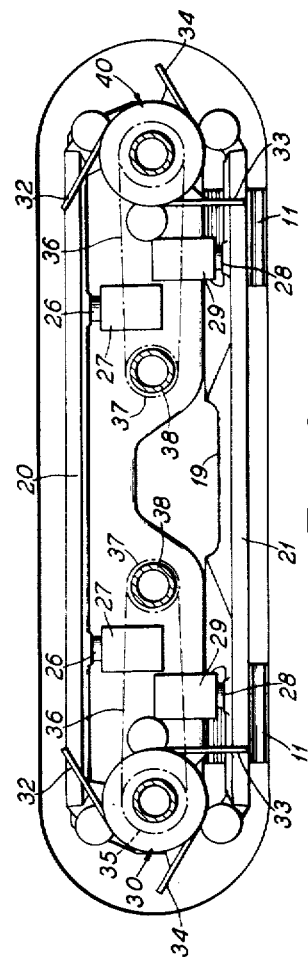
Figure 3 is a diagrammatic section taken generally along line 3—3 of Figure 2.

The main reason for providing paddles 32, 33 and 34 of each paddle assembly with different lengths, as above described, may best be understood by reference to Figure 3, which shows diagrammatically the position of the parts of the machine when the upper and lower cutter bars 20 and 21 are withdrawn by their hydraulic adjusting means from their normal cutting levels at the roof and floor of the bore pattern for the purpose of aiding in withdrawing the machine as a whole from the working face. The two paddle structures 30 and 40 may be rotated to the positions shown in Figure 3, wherein their longest arms 32 assume a position extending generally toward the center of the machine and within the vertical limits of the upper cutter bar; the intermediate length arms 33 are also positioned toward the center of the machine within the limit of the bottom cutter bar 21, while the shortest arms 34 extend outwardly toward opposite sides of the machine only a relatively short distance, thereby providing maximum lateral clearance for maneuvering the entire machine as it is withdrawn from the working face, or moved from place to place in the mine.

Although I have shown and described a certain embodiment of my invention, it will be understood that various changes and modifications may be made without departing from the spirit and scope of the invention as defined by the appended claims.

I claim:

1. In a mining machine having a mobile frame, a cuttings removing conveyor mounted on said frame with a receiving throat adjacent the floor level, and two cutter heads mounted in side by side relation toward one side of the receiving throat of said conveyor, each of said cutter heads including two radially extending arms with forwardly projecting cutter supports at their outer ends, for cutting contiguous, overlapping bores in advance of the machine, the inner cutter head being rotatable in the direction tending to sweep cuttings along the floor toward said throat for loading into the latter, and the outer cutter head being rotatable in the opposite direction, the improvement which consists of rotatably mounting a paddle assembly on the frame immediately to the rear of the outer cutter head and concentric with the latter, and means for rotating said assembly in the direction opposite to that of the outer cutter head.

2. The structure of claim 1, wherein the paddle assembly comprises a hub with a plurality of paddles extending therefrom, with their leading material-engaging faces disposed at an intermediate inwardly inclined angle to the plane of rotation of said paddle assembly.

3. The structure of claim 1, wherein the machine frame has a forwardly projecting bearing in which the outer cutter head is journalled, and the paddle assembly is rotatably mounted on said bearing.

4. The structure of claim 3 wherein the hub of the paddle assembly has driving connection with the inner cutter head through chain and sprocket means for rotating the paddle assembly in the same direction as said inner cutter head.

5. The structure of claim 4, wherein the frame has horizontally extending upper and lower cutter bars disposed rearwarding of said cutter heads and about which a cutter chain is trained, and the hub of the paddle assembly extends inwardly along the journal bearing of the adjacent outer cutter head and has a sprocket fixed thereon disposed rearwardly of the cutter chain and forming part of the chain and sprocket drive connection with the adjacent inner cutter head.

No references cited.

UNITED STATES PATENT OFFICE

CERTIFICATE OF CORRECTION

Patent No. 2,796,245                                June 18, 1957

Joseph Gonski

It is hereby certified that error appears in the printed specification of the above numbered patent requiring correction and that the said Letters Patent should read as corrected below.

Column 4, line 50, for "rearwarding" read --rearwardly--.

Signed and sealed this 13th day of August 1957.

(SEAL)
Attest:

KARL H. AXLINE                                    ROBERT C. WATSON

Attesting Officer                                Commissioner of Patents